US008868920B2

(12) United States Patent
Russo

(10) Patent No.: US 8,868,920 B2
(45) Date of Patent: Oct. 21, 2014

(54) METHOD, SYSTEM AND DEVICE FOR SECURING A DIGITAL STORAGE DEVICE

(75) Inventor: Leonard Russo, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 176 days.

(21) Appl. No.: 13/383,383

(22) PCT Filed: Jul. 12, 2009

(86) PCT No.: PCT/US2009/050340
§ 371 (c)(1),
(2), (4) Date: Jan. 10, 2012

(87) PCT Pub. No.: WO2011/008192
PCT Pub. Date: Jan. 20, 2011

(65) Prior Publication Data
US 2012/0102331 A1 Apr. 26, 2012

(51) Int. Cl.
*H04L 9/32* (2006.01)
*G06F 21/74* (2013.01)
*G06F 21/80* (2013.01)
*G06F 21/72* (2013.01)
*H04L 29/06* (2006.01)

(52) U.S. Cl.
CPC ........ *G06F 21/74* (2013.01); *G06F 2221/2107* (2013.01); *G06F 2221/2105* (2013.01); *G06F 2221/2147* (2013.01); *G06F 21/80* (2013.01); *G06F 21/72* (2013.01); *H04L 63/0428* (2013.01); *H04L 63/083* (2013.01)
USPC .......................................................... 713/183

(58) Field of Classification Search
CPC ......... G06F 21/72; G06F 21/74; G06F 21/80; G06F 2221/2107; G06F 2221/2147; H04L 63/083
USPC .......................................................... 713/183
See application file for complete search history.

(56) References Cited

U.S. PATENT DOCUMENTS

2003/0226025 A1* 12/2003 Lin et al. ....................... 713/193
2006/0174352 A1* 8/2006 Thibadeau ....................... 726/27
2007/0016800 A1 1/2007 Spottswood et al.
2007/0113279 A1 5/2007 Wang et al.

(Continued)

FOREIGN PATENT DOCUMENTS

CN 101236536 8/2008
CN 101246455 8/2008
KR 10-2008-0101799 A 11/2008

OTHER PUBLICATIONS

C E. Stevens (technical editor), Working Draft Project, American National Standard, T1E/1699-D, Information Technology—AT Attachment 8—ATA/ATAPI Command Set (ATA8-ACS), Revision 6a, NAIS INCITS 452-2008, Sep. 6, 2008.

(Continued)

*Primary Examiner* — Kambiz Zand
*Assistant Examiner* — Aubrey Wyszynski

(57) ABSTRACT

Method of securing a digital storage device, wherein a host is connected to the storage device, the host digitally locks the storage device so that unauthorized data access to the storage device is denied, the host sets the encryption conditions of the storage device in one of a condition wherein encryption of data on the storage device is enabled, and a condition wherein encryption of data on the storage device is disabled.

17 Claims, 2 Drawing Sheets

(56) References Cited

U.S. PATENT DOCUMENTS

| | | | |
|---|---|---|---|
| 2007/0234037 A1* | 10/2007 | Toda | 713/155 |
| 2008/0104701 A1* | 5/2008 | Peacock et al. | 726/22 |
| 2008/0163350 A1* | 7/2008 | Lu et al. | 726/9 |
| 2009/0046858 A1 | 2/2009 | Iyer et al. | |
| 2010/0050244 A1* | 2/2010 | Tarkhanyan et al. | 726/7 |
| 2010/0250959 A1* | 9/2010 | Challener et al. | 713/189 |
| 2010/0262817 A1* | 10/2010 | Edmiston et al. | 713/2 |

OTHER PUBLICATIONS

PCT International Search Report for PCT/US2009/050340.

Chinese Office Action dated Jan. 24, 2014 issued in CN Appl. No. 200980160426.0; 7 pages.

* cited by examiner

METHOD, SYSTEM AND DEVICE FOR SECURING A DIGITAL STORAGE DEVICE

CROSS-REFERENCE TO RELATED APPLICATIONS

This application claims priority to and the benefit of international patent application number PCT/US09/50340 filed 12 Jul. 2009, and the entire content of the international application is hereby incorporated by reference as though fully set forth herein.

FIELD OF THE INVENTION

The present invention relates to a method, system and device for securing a digital storage device. More particularly, but not exclusively, the present invention relates to a method of locking a digital storage device so that unauthorized data access to that storage device is denied, a data system capable of denying unauthorized data access to a digital storage device, and a digital storage device, comprising an Advanced Technology Attachment (ATA) interface for providing data access to a host processing unit.

BACKGROUND OF THE INVENTION

Digital storage devices are equipped with hardware interfaces for connection to host computers. An interface for providing access to a storage device within a host computer is the Advanced Technology Attachment (ATA). Known storage devices inside host computers such as for example hard disk drives (HDD) and solid state drives (SSD) are oftentimes equipped with ATA interfaces.

A commonly accepted standard in host-storage device communication is the standard ATA/ATAPI (Advanced Technology Attachment Packet Interface) command set. The security feature set one of the features of the command set. The security feature set includes a security set password command for restricting access to user data stored on the digital storage device. With the security set password command, the storage device may be locked or unlocked using a user password.

When the security set password is enabled, the storage device is locked, i.e. access to user data on the device is denied. The security set password is enabled by using the security password. Only after a power-on reset the security set password is enabled. Only until a security unlock command is completed without error the storage device can be accessed again. The security unlock command requires a correct user password. More information about this standard can for example be found in the INCITS (International Committee for Information Technology Standards) 452-2008 (D1699): AT Attachment 8—ATA/ATAPI Command Set standard documentation, which is publically available.

The security feature set allows a user or system to digitally lock a storage device so that unauthorized persons and/or unauthorized systems cannot access the storage device. When a storage device is disconnected from its original host computer, and thereafter connected to another host computer, the security password cannot be provided by the user or the other computer. The storage device cannot be unlocked by the new host computer, and cannot be accessed.

A security feature set can be set by a computer provider, or by and end user. The security feature set can for example be accessed through the BIOS. When a user password has been lost, and the storage device has been locked, the storage device provider may unlock the storage device using a master password, which is generally not available to end users.

Another feature that allows for data in a storage device to be secured is encryption. Encryption may be defined as the process of transforming data using an algorithm (which may be called cipher) to make it unreadable to systems or users except those systems or uses that possess special knowledge, usually referred to as a key.

In some geographical regions certain encrypted data is not allowed. In some regions, encrypted data or data encryption may for example only be allowed if it is encrypted according to specific standards, for example local standards, and/or if specific licenses or certifications are obtained before the storage device enters the region. In some regions, it may not be allowed to encrypt data on a computer at all. Foreign storage devices with encrypted data or data encryption capabilities may not comply with regional regulations and are therefore not allowed to be imported into the region, or at least not without complying with the required standards and obtaining the relevant licenses or certifications first.

However, geographical regions applying encryption restrictions oftentimes do allow for the ATA security feature set to be applied in computers and storage devices. So it may happen that for a certain region the ATA security functionality for storage devices is allowed, while certain encrypted data or encryption functionalities on storage devices are not allowed.

BRIEF DESCRIPTION OF THE DRAWINGS

For the purpose of illustration, certain embodiments of the present invention will now be described with reference to the accompanying diagrammatic drawings, in which.

DETAILED DESCRIPTION

In the following detailed description, reference is made to the accompanying drawings. The embodiments in the description and drawings should be considered illustrative and are not to be considered as limiting to the specific embodiment of element described. Multiple embodiments may be derived from the following description through modification, combination or variation of certain elements. Furthermore, it may be understood that also embodiments or elements that may not be specifically disclosed may be derived from the description and drawings.

Figure 1:
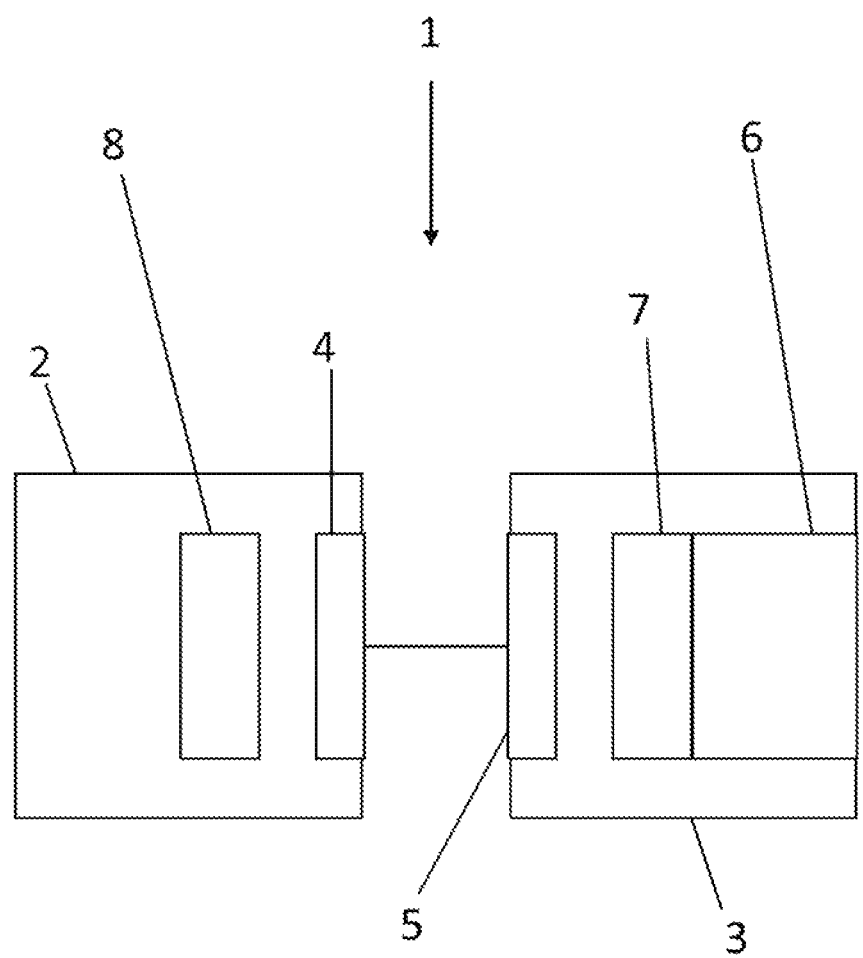
FIG. 1 shows a data system.

In FIG. 1 a data system 1 is shown, which may comprise a host 2 and a digital storage device 3. The latter may also be referred to as a storage device 3. The host 2 may comprise a central processing unit (CPU) for processing data in the system 1, also referred to as host processing unit. The host 2 may comprise a host connection interface 4 for data transfer to and from other devices that are connected in and/or to the host 2. The host connection interface 4 may comprise an interface that is arranged for connection to the storage device 3. The host 2 may further comprise one or more of a Basic Input/Output System (BIOS), at least one driver, at least one software application, Random Access Memory, Read Only Memory, and any additional number of circuits, connectors and software applications, and more.

The storage device 3 may for example comprise a hard disk drive, a solid state drive or any other device for storing digital data. The storage device 3 may comprise a storage device connection interface 5 arranged to transfer data to and from the storage device 3, between the storage device 3 and the connected piece of hardware. The storage device connection interface 5 may comprise an interface that is arranged to connect to the host 2, to deliver data to, and receive data from, the host 2. The storage device 3 may further comprise a data storage section 6. In illustrative examples the data storage section 6 may be arranged to store at least one, tens, hundreds or thousands of gigabytes of digital data. The storage device 3 may comprise a firmware section 7 that is preprogrammed to process and allocate incoming data.

In certain embodiment, the data system 1 may comprise a computer, a personal computer, a digital media player or the like. In an embodiment, the storage device 3 may be arranged inside the housing of the data system 1. In a further embodiment, the storage device 3 may comprise stand alone devices and may be arranged to be manually connected and/or disconnected from the host 2.

The host connection 4 and the storage device connection interface 5 may comprise interconnecting interfaces corresponding to a certain standard. In an embodiment, the interfaces 4, 5 may be arranged according to the Advanced Technology Attachment (ATA), sometimes also known as Integrated (or Intelligent) Drive Electronics (IDE), interface standard. The ATA interface may include Serial ATA, Parallel ATA, Fiber Channel ATA, or other similar techniques. The interfaces 4, 5 may for example also comprise a Serial Attached Small Computer System Interface (SAS), or any other suitable storage device interface technology.

The host 2 may be configured to lock the storage device 3. The host 2 may comprise a security software application 8 for locking the storage device 3. The security software application 8 may be configured to restrict or deny access to user data stored on the storage device 3. The security software application 8 may comprise a security feature set functionality according to the ATA/ATAPI command set (ATA8-ACS). More information about the command set can be found in, inter alia, the INCITS (International Committee for Information Technology Standards) 452-2008 (D1699): AT Attachment 8—ATA/ATAPI Command Set standard documentation, which is publically available. The command set may comprise instructions for the storage device firmware so as to configure certain storage device settings. Instructions relating to locking and/or unlocking the storage device 3 may be included in the security feature set.

The security software application 8 may be configured to issue a security password to the storage device 3 for locking the storage device 3, also referred to as the security set password command in accordance with the ATA/ATAPI command set standard. The storage device 3 may be locked so as to deny access to data on the storage device 3 unless the correct password is used to unlock the storage device 3.

The security software application 8 may be arranged to instruct the storage device firmware section 7 to lock the storage device 3, for example using the security password of the ATA/ATAPI command set. The security software application 8 may be a section of the system Basic Input/Output system (BIOS). The security software application 8 may be included in host firmware. The security software application may comprise a driver or software application that is configured to instruct the storage device firmware 7. Also other configurations of the security software application 8 may be suitable to lock the storage device 3 with the security password.

The storage device firmware section 7 may be configured so as to process security instructions according to the ATA/ATAPI command set. For example, the storage device firmware section 7 may be configured to store a 'security password locked' condition of the storage device 3 so that the data on the storage section 6 cannot be accessed.

In other embodiments, other interface standards than the ATA/ATAPI command set may be applied. In accordance, other security password instructions than the security set password command may be applied for locking the storage device 3, and the software security application 8 and the storage device firmware section 7 may also be configured accordingly.

The security software application 8 may be configured to set an encryption condition of the storage device 3. The security software application may be configured to set an encryption management condition of the storage device 3. In an embodiment, encryption on the storage device 3 may be enabled, or encryption on the storage device 3 may be disabled. Encryption enabled and encryption disabled may be considered as different encryption conditions. The security software application 8 may be configured to enable or disable encryption of data on the storage device 3, in particular on the storage section 6 thereof. In this description it may be understood that when encryption is enabled, data encryption on the storage device 3 is facilitated, and that when encryption is disabled, data encryption on the storage device 3 is not facilitated. The encryption enablement function may comprise an encryption key management tool. For example, when encryption on the storage device is enabled the data on the storage device may be pre-encrypted.

Prior to encryption being enabled, the data on the storage device is pre-encrypted but is still freely accessible. The encryption keys may be provided to activate the encryption. When these keys are applied the data may not be freely accessible anymore.

When the security password is enabled a user may be prevented from accessing the storage device 3 and the encryption keys stored thereon. When encryption is disabled, a user may access the storage device 3 as well as the data stored thereon. Furthermore, there may be no encryption of data or encryption key management facilitated when encryption is disabled.

In a further embodiment, when the security password is disabled and encryption is enabled, a user may access the storage device 3 but may not access the data because it is encrypted. The user may access the data by applying the encryption keys.

In again a further embodiment, when the security password is disabled and encryption is enabled, a user may access the storage device 3 and may access the data. The data may be pre-encrypted but is still freely accessible. Furthermore, encryption keys may be provided so that the user may apply the encryption lock.

Encryption of data on the storage device 3 may be enabled or disabled via the firmware section 7 of the storage device 3. The firmware section 7 may be configured to process and store the encryption condition as instructed by the security software application 8. The firmware section 7 may be set so that encryption is enabled, or the firmware section 7 may be set so that encryption is disabled.

The security software application 8 may be arranged to enable or disable encryption on the storage device 3 by sending a data bundle that includes the security set password command. The storage device 3 may be locked and encryption may be enabled by sending a data bundle comprising the ATA/ATAPI standard security password and an instruction enabling encryption. The data bundle may comprise a command structure and a data package, a part of which may be used for specific ATA/ATAPI standard commands. The encryption condition instructions may be included in certain sections of the command structure and/or the data package that are not taken by the ATA/ATAPI commands.

For example, to indicate an encryption condition the storage device registers may be re-set when issuing the security password command. The registers named Feature, Sector count, LBA Low, LBA Mid, LBA high may be used to indicate that the storage device 3 is enabling or disabling encryption. These registers may remain unaffected by the security password command so that they are available for setting an encryption allowance condition. Also lower bits 3:0 of the register named Device may be available for setting an encryption condition. Encryption may be enabled by setting at least one bit in any of these register sections to one. Encryption may be disabled by setting at least one bit in any of these register sections to zero.

Correspondingly, the storage device firmware 7 may be configured to process a data bundle comprising both the security password and the encryption condition instructions. The firmware 7 may be configured to store the encryption condition by setting a bit in one of the register sections Feature, Sector count, LBA low, LBA mid, LBA high, Device lower bits 3:0 to one or zero, respectively for enabling or disabling encryption.

The security software application 8 may be configured to issue a data bundle comprising the security password and the encryption condition. The data bundle may comprise a command structure and a data package. As known from the ATA/ATAPI standard the data package may comprise 512 bytes that is communicated to the storage device together with the security password. The data package may also be of different sizes, for example one kilobyte. The command structure may comprise a 28 bit command containing the security password, although the bit size may be different and subject to changes, as may be determined by the ATA/ATAPI standard. As the data package may be sent together with the security password command, a part of the data package may be available to set the encryption conditions. In an embodiment, the data package may comprise at least one byte that is configured to set the encryption condition of the storage device. Correspondingly, the storage device firmware 7 may be configured to store the encryption condition based on that at least one byte. Also multiple bytes may be used to set the encryption condition.

Figure 2:
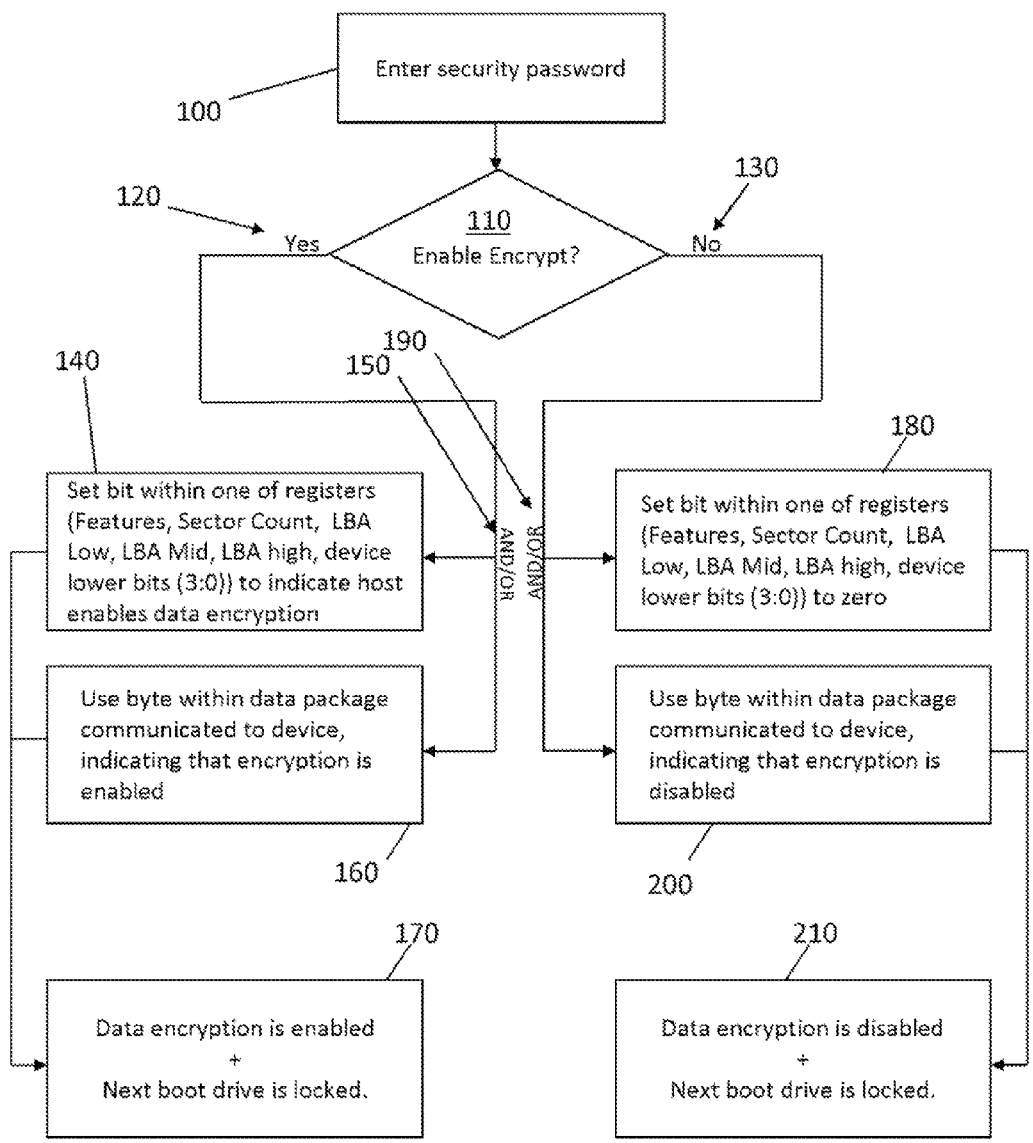
FIG. 2 shows a flow chart of a method of locking a digital storage device and enabling or disabling encryption on that storage device.

A method of securing a storage device 3 is shown in FIG. 2. After booting, the security password may be enabled via the BIOS, or another software application such as a driver, in step 100. By enabling the security password the host 2 may lock the storage device 3, wherein the storage device 3 may be accessed at a next boot by entering the security password.

Encryption may be enabled or disabled in step 110. The security software application 8 may ask a user to set the encryption condition, or the user or system may have to actively indicate the encryption condition. If in the latter case, the user or system does not choose an encryption condition, the system may itself switch to a default, which may either be an encryption enabling or disabling condition. The encryption condition may be indicated via the BIOS or another software application:

In an embodiment, the encryption condition may be set when the security password is enabled. For example, either the drive is locked and data encryption is enabled, or the drive is locked and data encryption is disabled, or the drive is unlocked. When a user or system opts for locking the storage device 3 in step 100, encryption may be enabled (120) or disabled (130).

A user or system may enable encryption in one way, or a combination of ways. In step 140, encryption may be enabled by setting at least one bit in one of the registers of the storage device 3 named Features, Sector Count, LBA Low, LBA Mid, LBA High or in bits 3:0 of Device to one. This may indicate to the storage device 3 that encryption is enabled. The encryption enabling instruction may be included in the data bundle that includes the security password command. One or multiple bits in one or more registers may be set to enable encryption.

As indicated by junction 150 encryption may be enabled by choosing or combining different methods. In addition to or instead of setting a bit a registers as indicated by step 140, a byte within the data package communicated to the device may be used to indicate to the storage device firmware 7 that encryption is enabled, as indicated by step 160. As explained above, the data package may be included in the data bundle that includes the security password command.

At step 170, encryption is enabled, and the security password is enabled. At a next boot, since the security password is enabled, the security password has to be entered to access the storage device 3. Since encryption is enabled, data on the storage device 3 may be pre-encrypted and/or encryption keys may be provided.

A user or system may opt for disabling encryption at step 130. A user or system may disable encryption in one way, or a combination of ways. In step 180, encryption may be disabled by setting at least one bit in one of the registers of the storage device 3 named Features, Sector Count, LBA Low, LBA Mid, LBA High or in bits 3:0 of Device to zero. This may indicate to the storage device 3 that encryption is disabled. The encryption disabling instruction may be included in the data bundle that includes the security password command. One or multiple bits in one or more registers may be set to disable encryption.

As indicated by junction 190 encryption may be disabled by choosing or combining different methods. In addition to or instead of setting a bit in a registers as indicated by step 180, a byte within the data package communicated to the device may be used to instruct to the storage device firmware 7 that encryption is disabled, as indicated by step 200. The data package may be included in the data bundle that includes the security password command.

At step 210, encryption may be disabled, and the security password may be set. Then, the system 1 may be rebooted, wherein the storage device 3 is locked. If a correct security password is entered through the security software application 8 the storage device 3 may be accessed. Since encryption is disabled, data on the storage device 3 cannot be encrypted.

According to an aspect there may be provided a method of securing a digital storage device 3. The method may include that a host 2 is connected to the storage device 3. The method may also include that the host 2 digitally locks the storage device 3 so that unauthorized data access to the storage device 3 may be denied. The method may further include that the host 2 may set the encryption conditions of the storage device 3 in a condition wherein encryption of data on the storage device 3 is enabled, and/or in a condition wherein encryption of data on the storage device is disabled, as shown in an exemplary embodiment in FIG. 2, for example steps 170 and 210, respectively.

According to a second aspect there may be provided a data system 1 capable of denying unauthorized access to a storage device 3. The system 1 may comprise a host 2 and a digital storage device 3. The host 2 may be provided with a CPU, a security software application 8 and a host connection interface 4. The storage device 3 may be provided with a firmware section 7, a data storage section 6 and/or a storage device connection interface 5. The interfaces 4, 5 may be arranged to be connected to each other to allow data transfer between the storage device 3 and the host 2. The security software application 8 may be configured to issue a security password to the storage device 3 for locking the storage device 3 and/or to set an encryption condition of the data storage section 6. The storage device 3 may be configured to store an encryption condition of the storage device 3 so that encryption of the storage device 3 is enabled or disabled.

According to a third aspect there may be provided a digital storage device 3. The digital storage device 3 may comprise a data storage section 6, a firmware section 7, and/or an Advanced Technology Attachment (ATA) interface 5 for communication with a host processing unit. The storage section 6, for example the firmware section 7 thereof, may be configured to (i) process a data bundle comprising a Set Security Password and encryption condition instructions, (ii) digitally lock the storage device 3 through the Set Security Password instruction, and/or (iii) store the encryption condition of the storage device 3 in one of (i) a condition wherein encryption of data on the storage device is enabled (e.g. see step 170), and/or (ii) a condition wherein encryption of data on the storage device is disabled (e.g. see step 210), based on said encryption condition instructions.

The combined locking and encryption feature as explained above may be advantageous for selectively enabling and disabling data encryption on storage devices 3, depending on a particular geographical region to which they are to be exported by the use of the ATA command set standard, which may already be applied as a standard in most storage device inside a computer. For example, a batch of storage devices that is intended to be transported to a geographical region having no encryption restrictions may be locked while having encryption enabled. This may allow for the option of importing locked storage devices 3 having encrypted or easy encryptable data into those regions. On the other hand, a batch of storage devices 3 that is intended to be transported to a geographical region that does not allow encryption may have encryption disabled. This may allow relatively easy import of those storage devices 3 into those restrictive regions. At the same time, the storage device 3 may be locked so as to provide for another form of security.

Hence, the storage devices 3 may be transported to substantially all geographical regions, while being secured. With relatively low effort and/or costs the storage devices 3 the encryption conditions may be set using the data bundle that includes the ATA/ATAPI security feature set.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, while a reference to a certain number of elements does not exclude the possibility having more than that number of elements. A single processor or other unit may fulfil the functions of several items recited in the disclosure, and vice versa several items may fulfil the function of one item.

The mere fact that certain measures are recited in mutually different dependent claims does not indicate that a combination of these measured cannot be used to advantage. Multiple alternatives, equivalents, variations and combinations may be made without departing from the scope of the invention. Multiple alternatives, equivalents, variations and combinations may be made without departing from the scope of the invention.

The invention claimed is:

1. Method of securing a digital storage device, wherein a host is connected to the storage device, the host digitally locks the storage device so that unauthorized data access to the storage device is denied, the host sets the encryption conditions of the storage device in one of a condition wherein encryption of data on the storage device is enabled, and a condition wherein encryption of data on the storage device is disabled wherein the host locks the storage device by issuing a Set Security Password command, and enables encryption on the storage device by setting a bit within at least one of a register named Feature, a register named Sector Count, a register named LBA Low, a register named LBA Mid, a register named LBA high, and lower bits 3:0 of a register named Device, to one.

2. Method of setting encryption conditions according to claim 1, wherein only after rebooting the host the storage device is locked and the encryption condition is set.

3. Method of setting encryption conditions according to claim 1, wherein the host issues a Set Security Password command to lock the storage device.

4. Method of setting encryption conditions according to claim 1, wherein host firmware locks the storage device and sets the encryption conditions of the storage device through an Advanced Technology Attachment (ATA) interface.

5. Method of setting encryption conditions according, to claim 1, wherein the host locks the storage device by issuing a Set Security Password command, and disables encryption on the storage device by setting a bit within at least one of a register named Feature, a register named Sector Count, a register named LBA Low, a register named LBA Mid, a register named LBA high, and lower bits 3:0 of a register named Device, to zero.

6. Method of setting encryption conditions according to claim 1, wherein the host locks the storage device by issuing a data bundle comprising a Set Security Password command, wherein the storage device is instructed by at least one byte of the data bundle to set the encryption condition of the storage device.

7. Method of setting encryption conditions according to claim 6, wherein the data bundle is at least approximately 512 bytes.

8. Method according to claim 1, wherein the host sends a data bundle to the storage device for setting, the security password and the encryption conditions, and the data bundle comprises a command structure and a data package.

9. Method according to claim 1, wherein the storage device is locked and encryption is enabled on at least one storage device that is set for transport to one geographical region, and the storage device is locked and encryption is disabled on at least one storage device that is set for transport to another geographical region.

10. Data system capable of denying unauthorized access to a storage device, comprising, a host and a digital storage device, wherein the host is provided with a CPU, a security software application and a host connection interface, the storage device is provided with a firmware section, a data storage section and a storage device connection interface, the interfaces are arranged to be connected to each other to allow data transfer between the storage device and the host, the security software application is configured to issue a security password to the storage device for locking the storage device and to set an encryption condition of the data storage section, and the storage device is configured to store an encryption condition of the storage device so that encryption of the storage device is enabled or disabled, wherein the storage device firmware section comprises register sections named Feature, Sector Count, LBA Low, LBA Mid, LBA high, and a register section consisting of lower bits 3:0 of a register named Device, and the firmware section is configured to store its encryption allowance condition through at least one bit in the at least one of the register sections.

11. Data system according to claim 10, wherein the host and the storage device are in connection using an Advanced Technology Attachment (ATA) interface.

12. Data system according to claim 10, wherein the storage device comprises a hard drive and/or a solid state drive.

13. Data system according to claim 10, wherein the host comprises a Basic Input/Output System (BIOS) comprising said security software application.

14. Data system according to claim 10, wherein the firmware section is configured so that encryption is enabled when said at least one bit is set to one, and when said at least one bit is set to zero encryption is disabled.

15. Data system according to claim 10, wherein the security software application is configured to issue a data package to the storage device, the data package comprising at least one byte configured to set the encryption condition of the storage device, and the storage device firmware is configured to store the encryption condition based on said at least one byte.

16. Digital storage device, comprising a data storage section, a firmware section, and an Advanced Technology Attachment (ATA) interface for providing data access to a host processing unit, wherein the firmware section is configured to process a data bundle comprising Set Security Password and encryption condition instructions, digitally lock the storage device through the Set Security Password instruction, and store the encryption condition of the storage device in one of a condition wherein encryption of data on the storage device is enabled, and a condition wherein encryption of data on the storage device is disabled based on said encryption condition instructions, wherein the firmware section comprises register sections and a register section consisting of lower bits 3:0 of a register and the firmware section is configured to store its encryption allowance condition through at least one bit in the at least one of the register sections.

17. Digital storage device according to claim 16, wherein the host locks the storage device by issuing a Set Security Password command, and enables encryption on the storage device by setting a bit within at least one of a register to one, and disables encryption on the storage device by setting a bit within at least one of a register to zero.

\* \* \* \* \*

UNITED STATES PATENT AND TRADEMARK OFFICE
CERTIFICATE OF CORRECTION

PATENT NO.           : 8,868,920 B2
APPLICATION NO.      : 13/383383
DATED                : October 21, 2014
INVENTOR(S)          : Leonard Russo Page 1 of 1

It is certified that error appears in the above-identified patent and that said Letters Patent is hereby corrected as shown below:

In the Claims,

In column 8, line 9, in Claim 1, delete "disabled" and insert -- disabled, --, therefor.

In column 8, line 17, in Claim 2, delete "host" and insert -- host and --, therefor.

In column 8, line 26, in Claim 5, delete "according," and insert -- according --, therefor.

In column 8, line 44, in Claim 8, delete "setting," and insert -- setting --, therefor.

In column 8, line 54, in Claim 10, delete "comprising," and insert -- comprising --, therefor.

In column 10, line 14, in Claim 16, delete "register" and insert -- register, --, therefor.

Signed and Sealed this
Third Day of March, 2015

Michelle K. Lee
*Deputy Director of the United States Patent and Trademark Office*